United States Patent [19]

Goldis et al.

[11] 4,320,407

[45] Mar. 16, 1982

[54] FLUID PUMP SYSTEM FOR AN INK JET PRINTER

[75] Inventors: Alexander Goldis, Southfield; Kenneth R. Sellen, Dearborn Heights; Eugene F. Banka, Livonia, all of Mich.

[73] Assignee: Burroughs Corporation, Detroit, Mich.

[21] Appl. No.: 150,731

[22] Filed: May 19, 1980

[51] Int. Cl.[3] .............................................. G01D 15/18

[52] U.S. Cl. .................................. 346/140 R; 346/75

[58] Field of Search .............. 346/75, 140 IJ, 140 PD, 346/140 R

[56] References Cited

U.S. PATENT DOCUMENTS

| | | | |
|---|---|---|---|
| 3,761,953 | 9/1973 | Helgeson et al. | 346/140 IJ X |
| 3,929,071 | 12/1975 | Cialone et al. | 346/140 IJ X |
| 4,042,937 | 8/1977 | Perry et al. | 346/75 X |
| 4,050,078 | 9/1977 | Isayama et al. | 346/140 IJ |
| 4,067,020 | 1/1978 | Arway | 346/75 |
| 4,079,384 | 3/1978 | Takano et al. | 346/140 IJ |
| 4,089,007 | 5/1978 | Perry et al. | 346/75 X |

*Primary Examiner*—George H. Miller, Jr.

*Attorney, Agent, or Firm*—Delbert P. Warner; Kenneth J. Cooper; Charles E. Quarton

[57] ABSTRACT

A fluid pump system for an ink jet printer apparatus includes a reservoir of printing fluid, a filter for removing contaminants from the printing fluid, and an apparatus for printing characters with the printing fluid. A gear pump delivering steady, stable fluid pressure pumps the virtually contaminant free printing fluid to the printing apparatus. The gear pump also circulates to the reservoir an amount of printing fluid in excess of the amount required by the printing apparatus. A device regulates when the virtually contaminant free printing fluid is supplied to the means for printing and an additional device supplies virtually contaminant and air-free printing fluid to the means for printing.

12 Claims, 6 Drawing Figures

FLUID PUMP SYSTEM FOR AN INK JET PRINTER

BACKGROUND OF THE INVENTION

1. Field of the Invention

This invention relates to a fluid pump system for ink jet printer apparatus.

2. History of the Prior Art

The use of nonimpact endorsers requires a supply of printing fluid to an ink jet printer apparatus. The prior art has generally utilized a piston driven positive displacement fluid pump to circulate printing fluid through an ink jet printer system. These positive displacement fluid pumps suck fluid from a reservoir during piston travel in one direction and expel the fluid into the ink jet printer system during piston travel in the opposite direction. However, this alternating pumping action creates fluid pressure pulses which must be dampened to provide the required steady fluid flow to the ink jet printer apparatus. The effect of the fluid pressure pulses is often minimized by adding fluid accumulators to an ink jet printer system. These components absorb a pulse of fluid upstream from the ink jet printer apparatus so that a steady flow of pressurized fluid is available for accurate printing at the ink jets. Nevertheless, obvious drawbacks to such a system are the cost and space requirements of the components.

Quality nonimpact endorsement systems depend upon a continuous source of contaminant and air-free fluid since characters are printed with individual drops of fluid. The introduction of air into the fluid supply can result in a droplet stream gap with air replacing a fluid drop. Aerated fluid may also cause sporadic losses of fluid pressure due to the increased compressibility of an air-fluid mixture relative to a pure fluid. The pressure loss may then be manifested by slower fluid drops from the ink jet printer apparatus which consequently form improperly shaped characters on a printing surface.

Some systems separate the air from the printing fluid with air traps, air purge valves, vacuum pumps, filters, and fluid preheaters. Printing fluid is heated to cause the air in the fluid to precipitate out of solution as small air bubbles. These collect into larger bubbles which are less dense than their surrounding fluid. The natural buoyancy forces cause the larger air bubbles to rise to the surface of the printing fluid where suction from a vacuum pump removes the air from the system upon the actuation of an air purge valve. An alternative to heating the fluid is to force the liquid through a fine filter. Tiny air bubbles are squeezed out of the fluid passing between the particles comprising the filter. The tiny, close air bubbles then draw together by Van Der Waals' intermolecular forces to form larger air bubbles and float to the fluid surface where they are vented from the system when an air purge valve is opened. As with the positive displacement fluid pump, accumulators and shock dampening components are needed to stabilize the fluid pressure during the periodic venting of accumulated air upon the opening of an air purge valve.

The disclosed invention supplies a necessary flow of pressurized, contaminant and air-free fluid to an ink jet printer apparatus with a system costing less in money, maintenance, and space. In addition, the design of the invention eliminates pressure shocks from fluid pumping and deaeration in a nonimpact endorser system to permit controlled printing of quality characters.

SUMMARY OF THE INVENTION

A fluid pump system for an ink jet printer apparatus utilizes a reservoir of printing fluid, a filter for removing contaminants from the fluid, a device for printing characters with the filtered fluid, and a gear pump delivering steady, stable fluid pressure. Fluid pressure regulators, a filter for separating air and subsequently introduced contaminants from the printing fluid, and fluid pressure indicators at predetermined locations in the system are also used.

The device for printing characters with filtered fluid includes an apparatus for controllably expelling and directing printing fluid onto a printing surface during a printing cycle. During a non-printing cycle, expelled fluid is caught and returned to the reservoir.

An amount of printing fluid in excess of the amount required by the character printer is collected in the reservoir. A supply of fluid independent of the fluid pump system is provided to replenish the reservoir when a low level of printing fluid is detected. A chamber in the reservoir separates air from the printing fluid, a vacuum pump removes the air from the reservoir, and the fluid is transmitted to a stainless steel wire mesh filter for removing contaminants.

A gear pump supplies a flow for circulating printing fluid throughout the fluid pump system. An adjustable pressure relief valve regulates the fluid pressure within the fluid pump system. Where a sensor detects a predetermined value of fluid pressure, solenoid actuated valves are energized to transmit printing fluid to the character printer.

DETAILED DESCRIPTION

The invention involves a compact system of components which cooperate to deliver a steady, stable flow of pressurized and deaerated printing fluid to the ink jets of a nonimpact endorser. Such a system delivers quality character printing in a space and at a cost which are less than those of existing systems.

Figure 1:
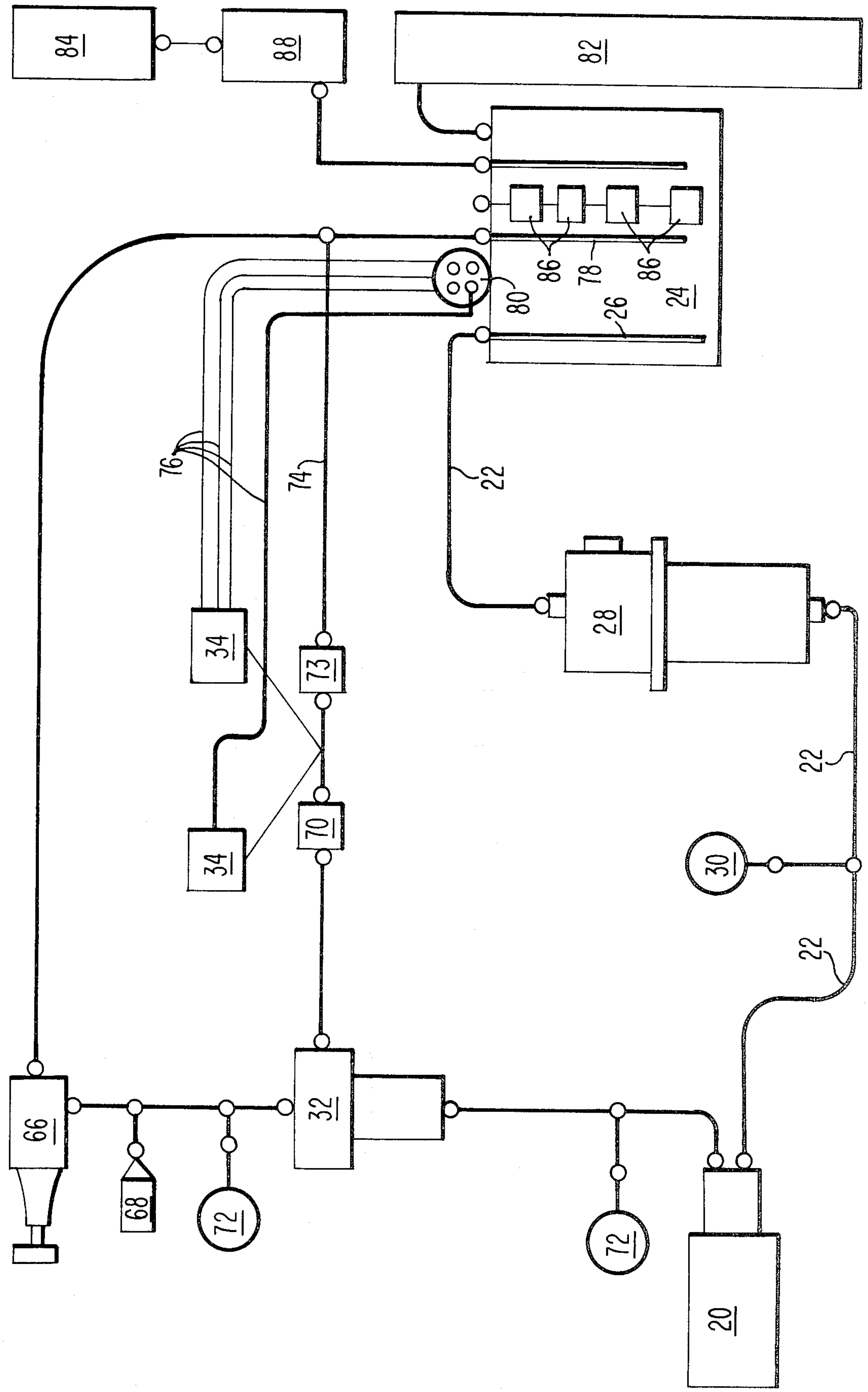
FIG. 1 schematically depicts a fluid pump system.

Referring to the representation of the fluid pump system in FIG. 1, a gear pump 20 creates a slight vacuum along input line 22 to draw printing fluid out of reservoir 24 and through exit tube 26. The fluid is first separated from virtually all its particulate contaminants by inlet filter 28. This filter contains a filtering element made of stainless steel wire mesh for trapping particles suspended in the printing fluid. Many microfiber filter elements were tested, but they chemically and physically deteriorated in the presence of the printing fluid and prematurely clogged downstream filters. Stainless steel, however, proved to be unaffected by the corrosive properties of the printing fluid while still trapping desired sizes of particulate matter.

As inlet filter 28 becomes clogged with contaminants, the vacuum imposed on input line 22 increases. This increase is displayed on inlet pressure gage 30 so that a field engineer may determine if cleaning or replacement of the inlet filter element is required. Pressure sensors contemplated for use in the fluid pump system include mechanical gages and electronic indicators.

The virtually contaminant free printing fluid enters gear pump 20 and is transmitted to a continuous deaeration filter 32 which separates air and subsequently introduced contaminants from the printing fluid. A virtually contaminant and air-free supply of printing fluid is necessary for the accurate operation of the ink jets 34 of a nonimpact endorser.

Figure 2:
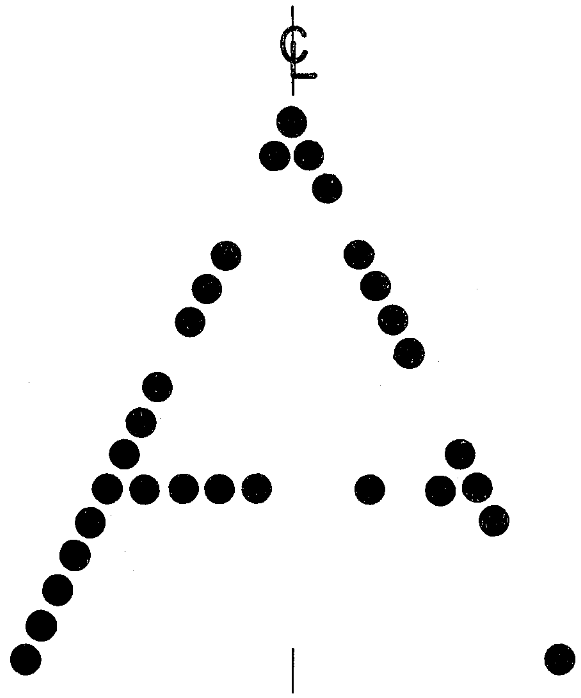
FIG. 2 represents an effect of air in printing fluid.
Figure 3:
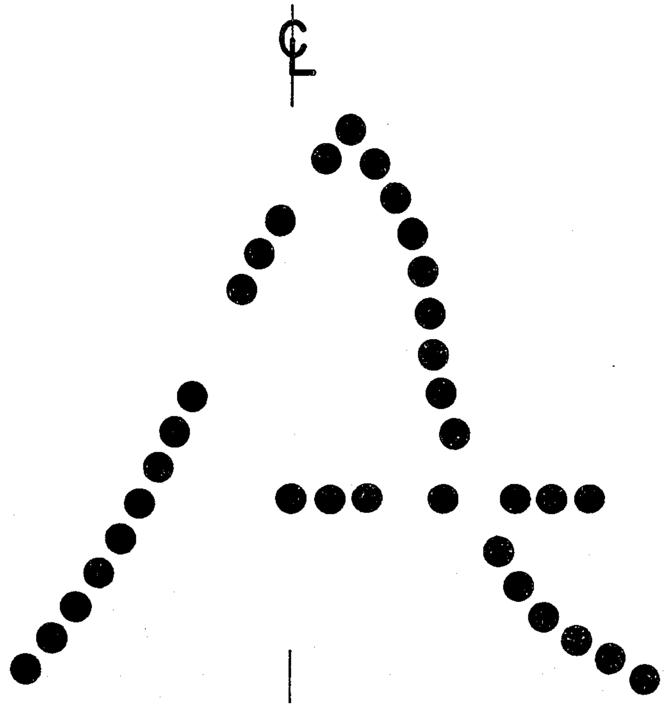
FIG. 3 represents a second effect of air in printing fluid.

FIGS. 2 and 3 illustrate possible effects of using aerated printing fluid for ink jet printing. FIG. 2 depicts the letter "A" when air "drops" are substituted for ink drops. In an extreme case, such an absence of ink may prevent recognition of the intended character. In FIG. 3, a second possible result of aerated printing fluid is depicted. Since air is more compressible than the printing fluid, the same work by gear pump 20 (FIG. 1) with deaerated fluid will instead generate less pressure in aerated fluid. When air pockets reach the ink jets 34, sudden pressure decreases will occur so that the next printing fluid drop will be subjected to an undeterminable amount of fluid pressure. This uncertainty renders impossible accurate coordination of printing surface movement (such as bank checks in a rapid document transport and endorsement system) and printing fluid velocity. Therefore, improperly formed characters, such as the "A" shown in FIG. 3, are the expected result.

The purposes of the continuous deaeration filter 32 (FIG. 1) are to eliminate contaminants and air from the printing fluid and the resulting pressure shocks from the fluid pump system so that a continuous stream of printing fluid is available at the ink jets 34. However, a steady, stable pressure must also be supplied to yield a uniform fluid drop velocity which can be coordinated with a moving printing surface.

Gear pump 20 furnishes the required steady fluid flow for quality printing from a nonimpact endorser. The proper selection of gear ratios and speeds combine to evenly pressurize printing fluid without the pressure pulses characteristic of systems using positive displacement pumps. Consequently, system shocks due to pressure pulses are eliminated by combining gear pump 20 and continuous deaeration filter 32.

Figure 4:
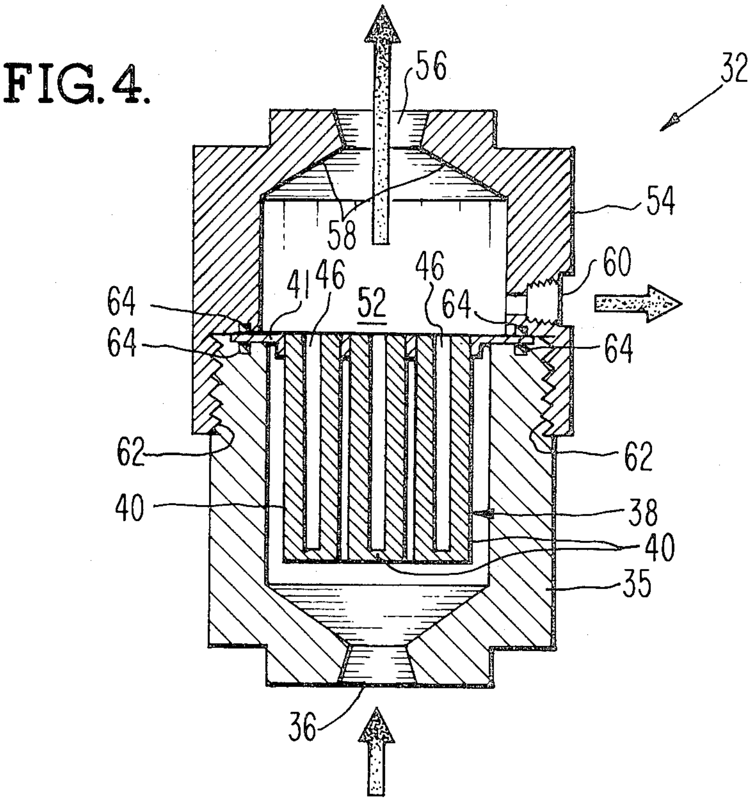
FIG. 4 illustrates a continuous deaeration filter.
Figure 5:
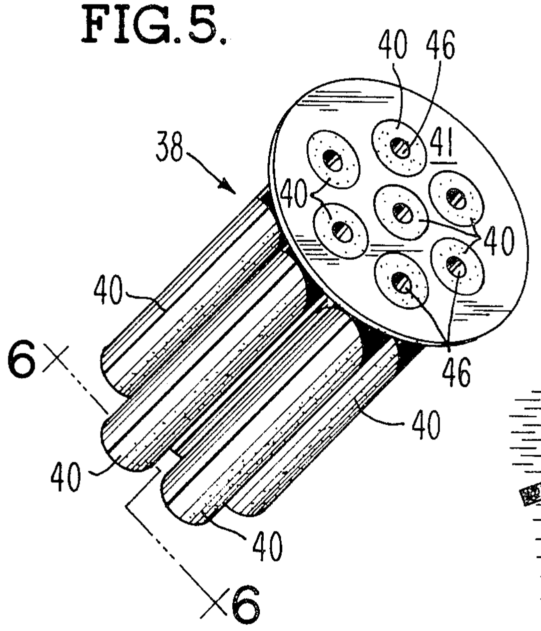
FIG. 5 depicts the element contained in the continuous deaeration filter.
Figure 6:
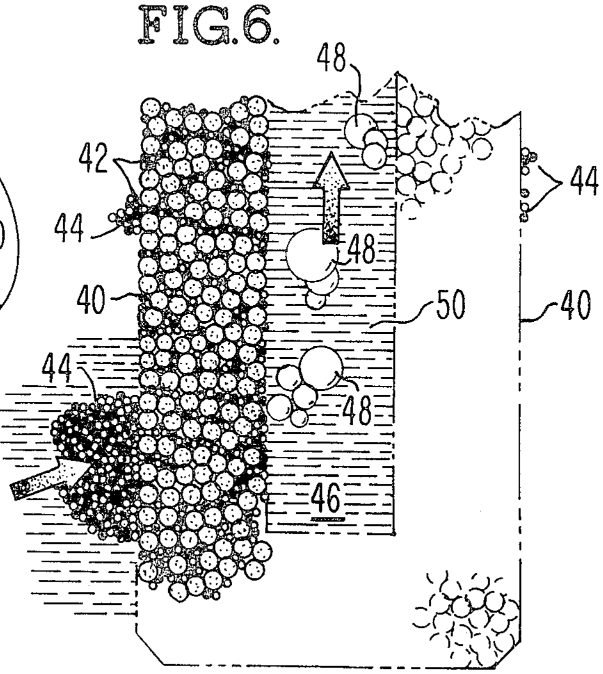
FIG. 6 is a sectional view of FIG. 5 along the line 6—6 illustrating the deaeration of printing fluid.

Pressurized aerated printing fluid from gear pump 20 enters a lower portion 35 (FIG. 4) of deaeration filter 32 through inlet port 36 and contacts the outer surface of the filter element 38 (FIG. 5). This filter element 38 traps particles introduced by gear pump internal wear as well as matter escaping capture by the inlet filter 28 (FIG. 1). Filter element 38 (FIG. 5) also acts as a sieve to break up the pressurized air "drops" having diameters greater than about 5 microns (FIG. 6). This sifting action is accomplished with hollow cylinders 40 of sintered stainless steel which are fixed to a common base 41 (FIG. 5) and have interstices 42 (FIG. 6) which transmit only "drops" with diameters up to about 5 microns.

The air-fluid separation by the deaeration filter 32 (FIG. 4) is achieved when the small "drops" are drawn together by the natural Van Der Waals forces of intermolecular attraction. As depicted in FIG. 6, the tiny drops 44 of air and fluid are squeezed through the interstices 42 of hollow cylinders 40. At the interior 46 of the hollow cylinders 40, the sifted "drops" emerge with diameters of up to about 5 microns. Van Der Waals forces then act to attract the "drops" and form large air bubbles 48 in the fluid 50. Air-fluid separation results as the air bubbles 48 grow in size and become increasingly less dense than the surrounding fluid 50. The large air bubbles 48 quickly float up the interior 46 of the hollow cylinders 40 into a filter reservoir 52 (FIG. 4) defined by the upper portion 54 of the deaeration filter 32.

The gear pump 20 in the preferred embodiment delivers an amount of printing fluid many times in excess of the requirements of the ink jets 34. Consequently, most of the printing fluid simply flows through deaeration filter 32 for recirculation in the fluid pump system. Fluid velocity through deaeration filter 32 is further increased near the outlet port 56 (FIG. 4) of the upper portion 54 by the tapered section 58 of the filter reservoir 52 leading to the outlet port 56. The combination of the natural buoyancy of the large air bubbles 48 (FIG. 6) in the printing fluid and the excess fluid flow generated by gear pump 20 (FIG. 1), transport virtually all air bubbles out of the filter reservoir 52 through outlet port 56 along with the excess printing fluid.

While the air bubbles and excess printing fluid flow from outlet port 56, deaerated printing fluid 50 (FIG. 6) flows to the ink jets 34 (FIG. 1) from a deaerated fluid outlet port 60 (FIG. 4). This port is at the side of the upper portion 54 of the deaeration filter 32 immediately above the junction of the upper and lower portions 54 and 35 respectively. The upper 54 and lower 35 portions of the filter 32 include a set of screw threads 62 for releasably joining the portions. Printing fluid is prevented from leaking out of and air is prevented from leaking into the deaeration filter 32 at the junction of the portions by seals 64 between upper and lower portions 54 and 35 respectively.

Fluid pressure in the fluid pump system is regulated by an adjustable pressure relief valve 66 (FIG. 1). When the fluid pressure attains the predetermined level, a pressure switch 68 emits an electronic signal to open solenoid actuated jet-on valve 70 for transmission of deaerated printing fluid from the deaeration filter 32 to ink jets 34. In addition to the pressure switch 68 which automatically initiates a response to fluid pressure conditions in the fluid pump system, deaeration filter gages 72 indicate the degree to which fluid transmission through the deaeration filter 32 is impeded by accumulated filtered matter. Consequently, the registered pressure difference between gages 72 signals to a field engineer when to clean or replace an unacceptably clogged filter element 38 (FIG. 5).

Printing fluid in excess of the amount needed by ink jets 34 is transmitted from pressure relief valve 66 to the fluid reservoir 24. Similarly, when the flow of printing fluid to ink jets 34 is to be stopped, the sequence of opening a solenoid actuated jet-relief valve 73, closing jet-on valve 70, then closing jet-relief valve 73 is followed and deaerated fluid remaining in drain line 74 is returned to fluid reservoir 24. During printing and nonprinting cycles when fluid is directed to ink jets 34 by opening jet-on valve 70, printing fluid not directed to a printing surface is caught and transmitted through return lines 76 to fluid reservoir 24. (For a detailed description of the structure and function of the system for catching ink jet emitted fluid, see the copending U.S. patent application entitled INK DROPLET CATCHER ASSEMBLY, by Ronald G. Shell, et al., Ser. No. 127,921, filed Mar. 6, 1980.)

The fluid reservoir 24 receives the excess printing fluid from pressure relief valve 66 and drain line 74 in return tube 78. Printing fluid from ink jets 34 contains paper dust, environmental dirt, and air captured during the flight of fluid drops from ink jets 34 to return lines 76. This fluid enters fluid reservoir 24 through jet return ports 80 and falls to the level of printing fluid accumulated in reservoir 24. During this fall, some of the air which was mixed with the fluid upon expulsion from ink jets 34 separates from the fluid. This air is drawn out of fluid reservoir 24 by a vacuum pump 82.

The quantity of printing fluid for the fluid pump system is replenished by a printing fluid supply 84 independent of the pump system. Fluid is added to fluid reservoir 24 when fluid level sensors 86 detect a low level of fluid in fluid reservoir 24 and control the emptying of fluid supply 84 by valve 88.

The vacuum created by gear pump 20 draws accumulated printing fluid from fluid reservoir 24 through exit tube 26 along input line 22 and into inlet filter 28. There the mixed-in paper dust and environmental dirt is separated from the printing fluid for transmission through the fluid pump system.

What is claimed is:

1. A fluid pump system for an ink jet printer apparatus comprising:
- a reservoir of printing fluid;
- filter means for removing virtually all particulate contaminants from the printing fluid;
- deaeration means for receiving the printing fluid, separating the fluid into an aerated fluid component and a deaerated fluid component, where the aerated component is substantially larger than the deaerated component, and transmitting deaerated fluid through a first port and aerated fluid through a second port;
- a gear pump delivering steady, stable fluid pressure for pumping said printing fluid through the deaeration means, providing deaerated fluid through the first port to the means for printing and providing the aerated fluid through the second port to the reservoir;
- means for printing characters with the deaerated virtually contaminant free printing fluid; and
- means for regulating when the virtually contaminant free printing fluid is supplied to the means for printing.

2. The invention of claim 1 further comprising means for indicating fluid pressure at predetermined locations in the fluid pump system.

3. The invention of claim 1 wherein the means for removing contaminants from the printing fluid comprises a filter having a wire mesh filter element.

4. The invention of claim 3 wherein the wire mesh filter element comprises stainless steel.

5. The invention of claim 1 wherein the means for regulating when the virtually contaminant free printing fluid is supplied to the means for printing comprises:
- means for regulating printing fluid pressure within the fluid pump system;
- means for sensing when the printing fluid pressure attains the regulated value;
- means, responsive to the means for sensing when the printing fluid pressure attains the regulated value, for transmitting printing fluid to the means for printing.

6. The invention of claim 5 wherein the means for regulating printing fluid pressure within the fluid pump system comprises an adjustable pressure relief valve.

7. The invention of claim 5 wherein the means, responsive to the means for sensing when the printing fluid pressure attains the regulated value, for transmitting printing fluid to the means for printing comprises solenoid actuated valves.

8. The invention of claim 1 wherein the means for printing characters comprises:
- means for controllably expelling and directing printing fluid onto a printing surface during a printing cycle;
- means for catching expelled printing fluid during a non-printing cycle; and
- means for returning to the reservoir expelled printing fluid caught during the non-printing cycle.

9. The invention of claim 8 wherein the reservoir of printing fluid comprises:
- means for receiving the aerated fluid;
- means for receiving the printing fluid from the means for returning to the reservoir expelled printing fluid caught during the non-printing cycle;
- means for adding printing fluid from a supply independent of the fluid pump system to replenish the quantity of printing fluid in the reservoir;
- means for separating air from the printing fluid; and
- means for transmitting printing fluid to the means for removing contaminants from the printing fluid.

10. The invention of claim 4 wherein the means for adding printing fluid from a supply independent of the fluid pump system comprises:
- means for sensing the level of printing fluid in the reservoir; and
- means, responsive to the means for sensing the level of printing fluid in the reservoir, for adding additional printing fluid into the reservoir.

11. The invention of claim 9 wherein the means for separating air from the printing fluid comprises means for removing air from the reservoir.

12. The invention of claim 9 wherein the means for removing air from the reservoir comprises a vacuum pump.

* * * * *

UNITED STATES PATENT AND TRADEMARK OFFICE
CERTIFICATE OF CORRECTION

PATENT NO. : 4,320,407

DATED : March 16, 1982

INVENTOR(S) : Alexander Goldis, Kenneth R. Sellen & Eugene F. Banka

It is certified that error appears in the above—identified patent and that said Letters Patent is hereby corrected as shown below:

Insert after the Title:

--Cross Reference To Related Application

U.S. Patent Application Number 150,732 filed of even date herewith in the names of Alexander Goldis, Kenneth R. Sellen & Eugene F. Banka, entitled "A Continuous Deaeration System For a Fluid Pump System", and assigned to the same assignee as the present invention is hereby incorporated by reference.--

Signed and Sealed this

***Thirteenth* Day of *July 1982***

[SEAL]

*Attest:*

GERALD J. MOSSINGHOFF

*Attesting Officer* *Commissioner of Patents and Trademarks*